United States Patent
Zhang et al.

(10) Patent No.: US 9,960,723 B2
(45) Date of Patent: May 1, 2018

(54) MOTOR DRIVE WITH RESONANCE DETECTION AND IMPEDANCE COMPUTATION

(71) Applicant: Rockwell Automation Technologies, Inc., Mayfield Heights, OH (US)

(72) Inventors: Shaofeng Zhang, Songjiang District (CN); Haihui Lu, Shanghai (CN); Yogesh P. Patel, Grafton, WI (US); Ahmed Mohamed Sayed Ahmed, Mequon, WI (US); Lixiang Wei, Mequon, WI (US); Richard Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 143 days.

(21) Appl. No.: 15/173,767

(22) Filed: Jun. 6, 2016

(65) Prior Publication Data
US 2017/0353138 A1    Dec. 7, 2017

(51) Int. Cl.
| | |
|---|---|
| *H02M 1/14* | (2006.01) |
| *H02P 27/06* | (2006.01) |
| *H02M 7/217* | (2006.01) |
| *H02M 1/12* | (2006.01) |
| *H02M 1/00* | (2006.01) |

(52) U.S. Cl.
CPC ............ *H02P 27/06* (2013.01); *H02M 1/126* (2013.01); *H02M 7/217* (2013.01); *H02M 2001/0009* (2013.01)

(58) Field of Classification Search
CPC ............ H02M 3/22; H02M 3/24; H02M 5/40; H02M 5/42; H02M 5/453;
(Continued)

(56) References Cited

U.S. PATENT DOCUMENTS

| | | |
|---|---|---|
| 5,367,448 A | 11/1994 | Carroll |
| 6,933,714 B2 | 8/2005 | Fasshauer et al. |

(Continued)

FOREIGN PATENT DOCUMENTS

| | | |
|---|---|---|
| EP | 2660961 A2 | 11/2013 |
| EP | 2930838 A2 | 10/2015 |

(Continued)

OTHER PUBLICATIONS

Takahiro Saeki et al., "Robust Active Damping Method for a PWM Converter Operating with an Unknown Inductance on the Power Grid", IEEJ Journal of Industry Applications, vol. 4, No. 3, Jan. 1, 2015, pp. 277-285.

(Continued)

*Primary Examiner* — Adolf Berhane
*Assistant Examiner* — Afework Demisse
(74) *Attorney, Agent, or Firm* — Fay Sharpe LLP

(57) ABSTRACT

Disclosed examples include power conversion systems, computer readable mediums and methods for mitigating input filter resonance, in which a controller operates an active front end (AFE) rectifier in a first mode to turn a single rectifier switching device on and off and measures a filter voltage or current signal while all of the rectifier switches are off. The controller determines a resonant frequency based on a transient response of the measured voltage or current signal, and selectively adjusts a rectifier control parameter to mitigate filter resonance based on the resonant frequency.

20 Claims, 4 Drawing Sheets

Figure 1:
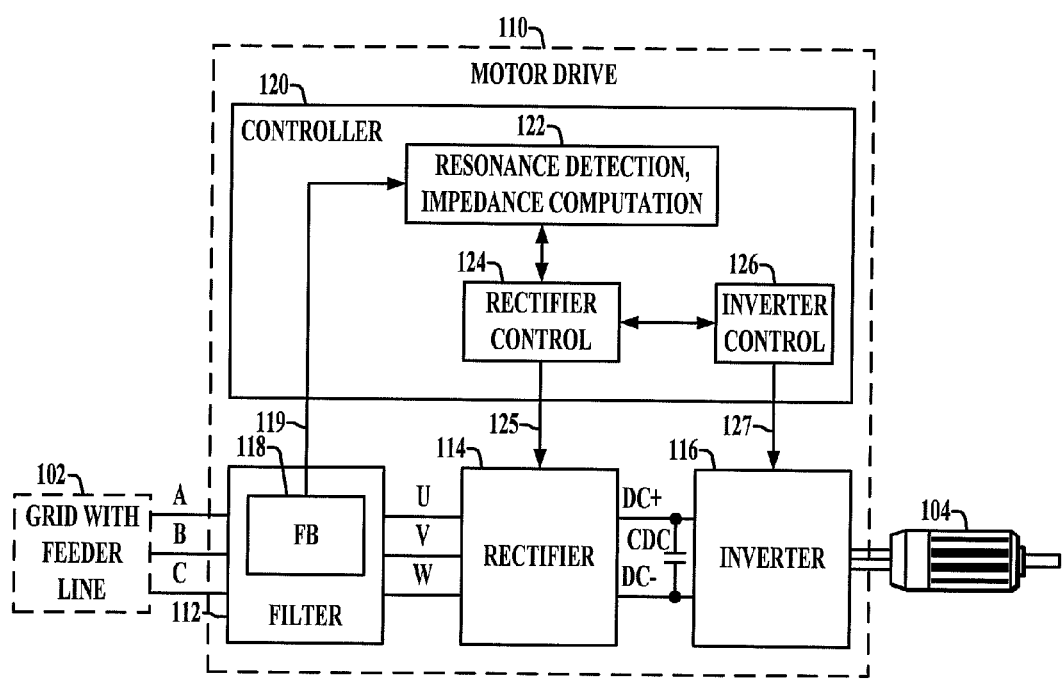

(58) Field of Classification Search
CPC . H02M 2007/4815; H02M 2007/4818; H02M 1/083; H02M 3/33507
See application file for complete search history.

(56) References Cited

U.S. PATENT DOCUMENTS

| | | | |
|---|---|---|---|
| 7,164,275 | B2 | 1/2007 | Gasperi |
| 7,751,211 | B2 | 7/2010 | Yuzurihara et al. |
| 8,144,492 | B2 | 3/2012 | Sakakibara |
| 8,259,426 | B2 | 9/2012 | Xiao et al. |
| 2011/0156664 | A1 | 6/2011 | Horihata |
| 2012/0212982 | A1* | 8/2012 | Wei ............... H02M 5/4585 363/37 |
| 2015/0318791 | A1* | 11/2015 | Baumann ............. H02M 5/458 318/504 |

FOREIGN PATENT DOCUMENTS

| | | |
|---|---|---|
| WO | WO2012010353 A1 | 1/2012 |
| WO | WO2012110088 A1 | 8/2012 |

OTHER PUBLICATIONS

Toyama K et al., "Transient oscillation suppression of input filter voltage and current for current-source three-phase PWM AC/DC converter", Power Conversion Conference—Nagaoka 1997, Proceedings of the Nagaoka, Japan Aug. 3-6, 1997, pp. 253-258.
Extended European Search Report of European Application No. 17173409.8-1809 dated Nov. 17, 2017, 7 pages.
ABB, ACS600, ACS800 User's Manual, ACA 635 IGBT Supply Sections 260 to 4728 kVA, ACS 800-17 Line-side Converter 120 to 1385 kVA, 3BFE 64013700 REV D; En, Effective Jul. 7, 2003, 124 pages.
ABB Solar Inverters, Firmware Manual, PVS800 Central Inverters, 3AUA0000058422 Rev C, EN, Effective May 17, 2013, 186 pgs.
Ghzaiel et al., "A Novel Grid Impedance Estimation Technique based on Adaptive Virtual Resistance Control Loop Applied to Distributed Generation Inverters", Aalborg University, Denmark, Proceedings of the 15$^{th}$ European Conf. on Power Electronics and Applications, EPE 2013, Downloaded from vbn.aau.dk on Apr. 18, 2016, 11 pages.

* cited by examiner

MOTOR DRIVE WITH RESONANCE DETECTION AND IMPEDANCE COMPUTATION

BACKGROUND INFORMATION

The subject matter disclosed herein relates to power conversion and more specifically to power converters with automatic impedance and resonance detection systems.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides power conversion systems, computer readable mediums and methods to mitigate input filter resonance. A controller operates an active front end (AFE) rectifier in a first mode to turn a single rectifier switching device on and off and measures a filter voltage or current signal while all of the rectifier switches are off. The controller determines a resonant frequency based on a transient response of the measured voltage or current signal, and selectively adjusts a rectifier control parameter to mitigate filter resonance based on the resonant frequency.

THE BRIEF DESCRIPTION OF THE DRAWINGS

Figure 2:
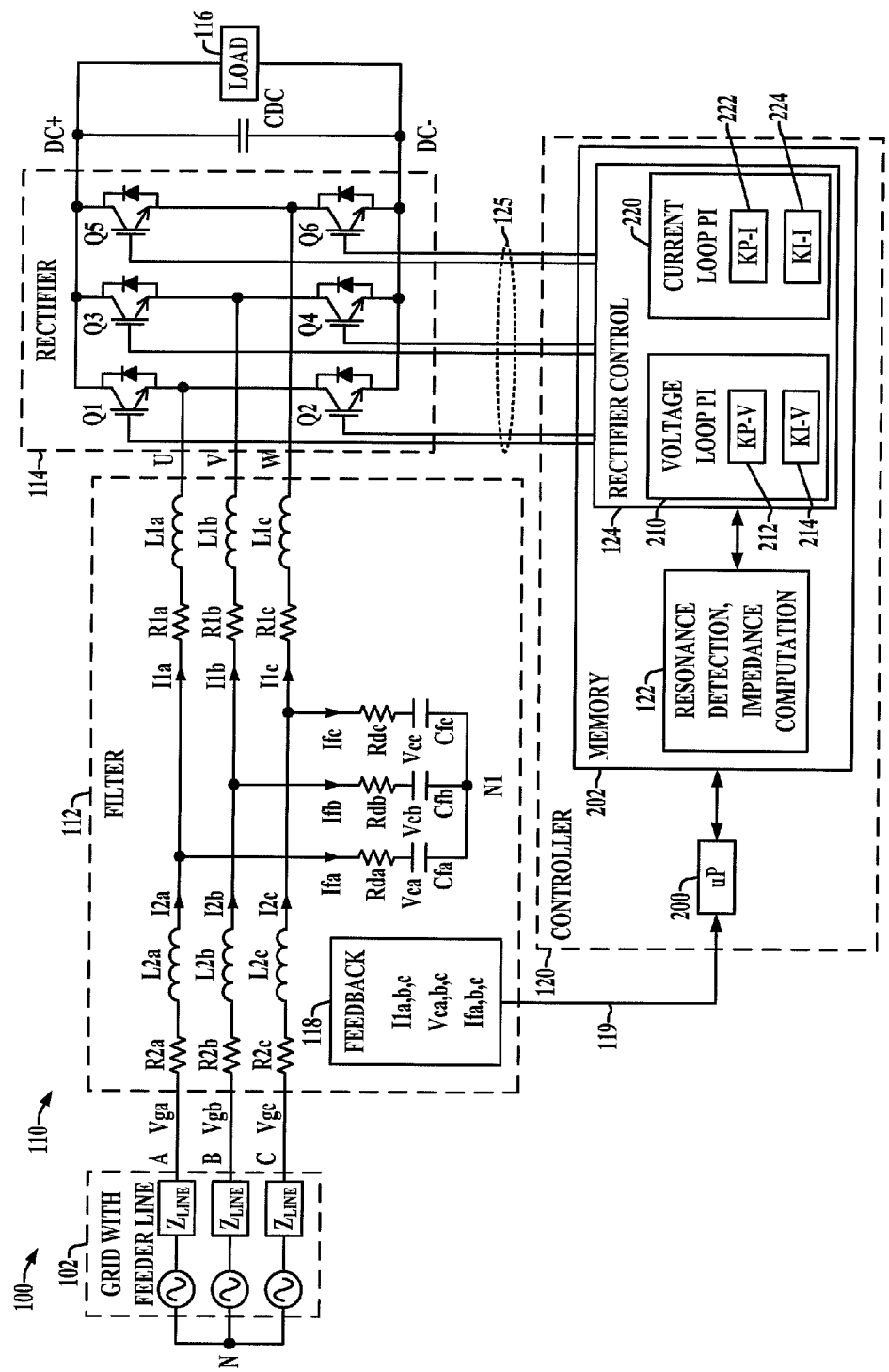
Figure 3:
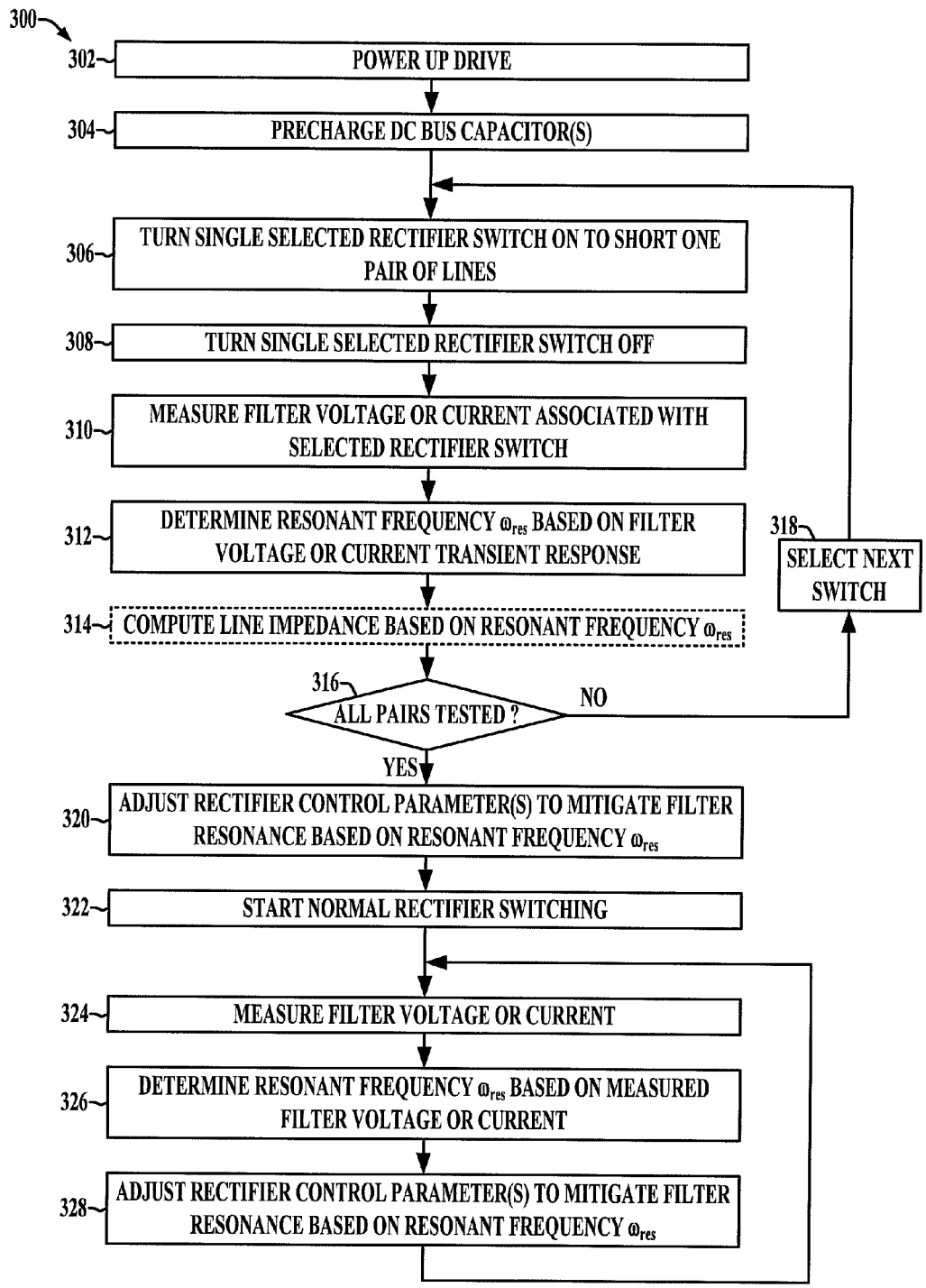
Figure 4:
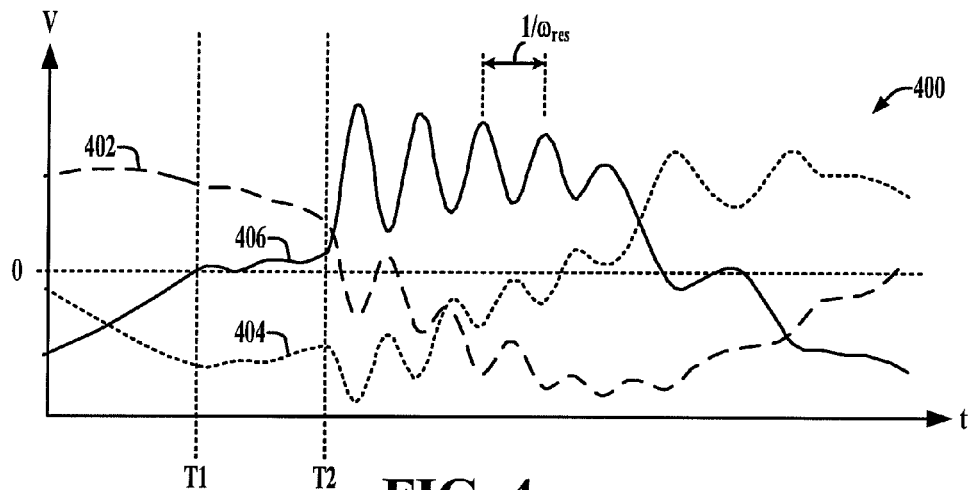
Figure 5:
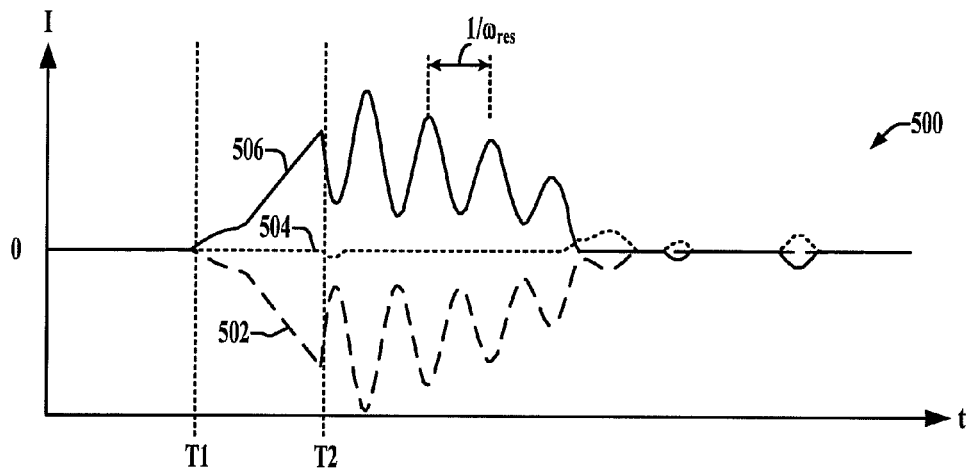
Figure 6:
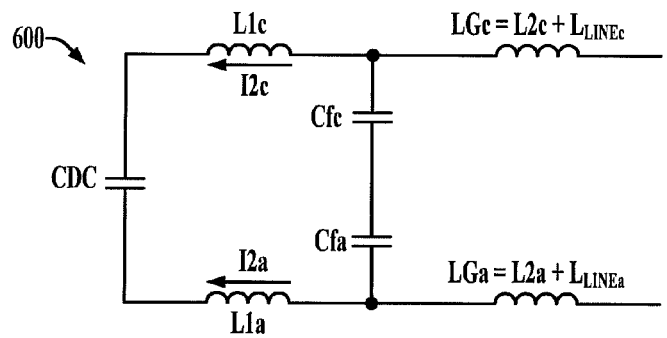

FIG. 1 is a schematic diagram.
FIG. 2 is a schematic diagram.
FIG. 3 is a flow diagram.
FIG. 4 is a signal waveform diagram.
FIG. 5 is a signal waveform diagram.
FIG. 6 is a schematic diagram.

DETAILED DESCRIPTION

Referring now to the figures, several embodiments or implementations are hereinafter described in conjunction with the drawings, wherein like reference numerals are used to refer to like elements throughout, and wherein the various features are not necessarily drawn to scale. FIG. 1 shows a power system 100 including a three phase AC power source 102 including a grid connection and associated feeder lines that provide AC input power along phase lines A, B and C to a motor drive power conversion system 110 to drive a motor load 104. The power conversion system 110 includes a three phase input filter circuit 112 that delivers AC power along lines U, V and W to the input of a three-phase active front end (AFE) rectifier 114. The filter circuit 112 includes active damping circuitry 118, and the drive 110 includes a damping control circuit or controller 120. The rectifier 114 has an input to receive AC input power along the lines U, V and W, and an output to provide a DC output signal. An intermediate DC circuit or DC bus is connected between the DC output of the rectifier 114 and the input of an output inverter 116. In one example, the DC intermediate circuit includes a capacitor CDC connected between positive and negative DC bus lines DC+ and DC− as shown in FIG. 1. In other examples, a current source converter implementation of the motor drive 110 includes one or more DC link chokes or inductors in the intermediate circuit between the output of the rectifier 114 and the inverter input. The inverter 116 in FIG. 1 includes a DC input coupled to the output of the rectifier 114 through the intermediate circuit, and an output coupleable to the motor load 104 to provide an AC output signal. In this example, the inverter 116 provides a three-phase output signal to drive the motor load 104. In other examples, a single phase AC output signal can be provided by the output of the inverter 116 to drive a load 104. The AFE rectifier 114 can provide DC input power to any suitable load or loads. In the example of FIG. 1, the system 110 includes a single inverter 116 operated by an inverter controller 126 to drive a single motor load 104. In other examples, the AFE rectifier 114 and the filter circuit 112 can be used in a multi-drive configuration to provide DC input power to multiple loads, such as a plurality of inverters 116 individually driving a separate motor load 104. Such a system can be provided in a multi-bay enclosure with common DC bus connections to provide power from the rectifier 114 to a plurality of inverters 116.

The power conversion system 110 can use a variety of different input filter topologies or configurations 112. For example, an inductor-capacitor (LC) or inductor-capacitor-inductor (LCL) input filter circuit can be associated with each AC input phase A/U, B/V, C/W to control the harmonic content of a connected power grid. For example, LCL or LC filters may be used in voltage source converters, such as the motor drive 110 of FIG. 1, and LC filters can be used with current source converters. Such filter circuits are subject to damage or degradation of the filter capacitors, such as by voltage surges or other transients, as well as degradation due to isolation of the filter circuit 112 and resonance. Filter capacitor degradation, in turn, may be costly in terms of replacement component costs, labor for inspection and replacement, as well as downtime for the power conversion system and any associated machinery. The input filter 112 can resonate, particularly at startup of the AFE rectifier 114 where the operation of the rectifier 114 and associated closed loop control loops implemented by the rectifier 114 have bandwidths including resonant frequencies of the input rectifier and the associated grid 102. In addition, filter resonance can occur when the line impedance of the grid and feeder lines of the source 102 changes, for example, when another system on the grid is powered up or down.

The illustrated system 110 includes a controller 120 with one or more processors and associated electronic memory with program instructions to mitigate input filter resonance. The controller 120 includes a rectifier control component or system 124 providing rectifier switching control signals 125 to IGBTs or other switches of the rectifier 114 to operate the AFE rectifier 114. The controller 120 also includes or implements an inverter control component or system 126 to provide inverter switching control signals 127 to operate the inverter 116. The controller 120 operates the motor drive 110 in various operational modes. In a first or standby mode, a resonance detection and impedance computation component 122 causes the rectifier controller 124 to actuate individual AFE switches to short circuit pairs of feeder lines for a non-zero time period while the inverter 116 is off. This induces a transient reaction by the impedance components of the filter 112 and the source 102. Following the pulsed transient event, the controller 120 obtains measurements of one or more filter voltages or currents via one or more feedback signals or values 119 from a feedback system 118 associated with the input filter 112 to evaluate transient response while all the rectifier and inverter switches are off. The controller 120 determines a resonant frequency $\omega_{res}$ based on the transient response of the measured voltage or current signal, and selectively adjusts one or more control parameters of the rectifier controller 124 to mitigate filter resonance based on the resonant frequency $\omega_{res}$. In various implementations, any combination of feedback signals can be used to determine the resonance frequency $\omega_{res}$ and/or to determine line impedance, including without limitation I1abc, I2abc, Vcabc, Ifabc or combinations thereof.

FIG. 2 shows further details of an example LCL filter circuit 112 in the power converter 110. Each phase of the grid and feeder line source 102 provides a line impedance $Z_{LINE}$, and the source delivers grid voltages Vga, Vgb and Vgc. The LCL filter circuit 112 includes first and second filter inductors L1 and L2 connected between the input of the rectifier 114 and the output of the source 102 for each phase A/U, B/V and C/W. The phase A/U of the filter 112 includes a first (rectifier side) inductor represented as an inductance L1a and a corresponding resistance R1a, as well as a second (grid side) inductor represented as an inductance L2a and a resistance R2a. Similarly, the filter phase B/V includes first and second inductors represented by inductances L1b, L2b and corresponding resistances R1b and R2b, and the filter phase C/W includes first and second inductors represented by inductances L1c, L2c and corresponding resistances R1c and R2c as shown in FIG. 2. Between the first and second inductors L1 and L2 of each phase line of the filter 112, a filter capacitor Cf is connected from the line joining the corresponding inductors L1 and L2 to a filter neutral N1. (Illustrated in the drawing as filter capacitors Cfa, Cfb and Cfc in series with corresponding damping resistances Rds, Rdb and Rdc which can be the equivalent series resistance (ESR) of the corresponding filter capacitor Cf or the combination of this ESR with an added separate damping resistor in the filter circuit 112). The filter neutral Ni can, but need not, be connected to the source neutral N. In other examples, the filter capacitors Cf can be connected and a L2 configuration, and the feedback system 118 can include current sensors for sensing currents through the delta-connected filter capacitors or currents flowing into the filter capacitor circuit branches, as well as voltage sensors for sensing the voltages across the delta-connected capacitors or line-line voltages between the filter capacitor circuit branches.

The feedback circuit or system 118 includes one or more sensors (not shown) to sense or detect one or more electrical conditions in the filter circuit 112. The feedback circuit 118 provides one or more feedback signals or values 119 (e.g., analog signals and/or converted digital values) to the controller 120 for use in closed loop feedback control of the motor drive 110 generally, as well as for use by the resonance detection and impedance computation component 122. In one example, the feedback circuit 118 includes current sensors to provide one or more signals or digital values representing filter input phase currents I2a, I2b and I2c representing the current flowing in the second inductors L2. The feedback circuit 118 can also include current sensors (not shown) to provide signals or values representing the filter output phase currents flowing through the first inductor L1 of each phase, including currents I1a, I1b and I1c (I1a,b,c). The feedback circuit 118 can also include current sensors (not shown) to provide signals or values representing the filter capacitor currents Ifa, Ifb and Ifc (Ifa,b,c) flowing into the filter capacitors Cf. In certain examples, moreover, the feedback circuit 118 can provide one or more signals or values 119 representing the filter capacitor voltages Vca, Vcb and Vcc (Vca,b,c).

As further shown in FIG. 2, the rectifier in one example is a switching rectifier with IGBT type switching devices Q1-Q6 individually coupled between a corresponding one of the AC input terminals U, V or W and one of the first and second DC output terminals DC+ or DC−. Other semiconductor-based switching devices can be used, including without limitation field effect transistors (FETs), etc. Each switching devices Q1-Q6 is operated by a corresponding rectifier switching control signal 125 from the rectifier controller 124 of the control circuit 120 to selectively connect or disconnect the corresponding AC input terminal to the corresponding DC output terminal.

The controller 120 and the rectifier controller 124 thereof operate the switching rectifier 114 in various different modes, including a standby mode and a second or normal operating mode. For instance, on power up of the power conversion system 110, the controller 120 operates in a standby mode in order to facilitate precharging of the DC bus capacitance CDC, for example, using a dedicated precharging circuit (not shown). During the standby operation, the inverter (FIG. 1) is turned off. The controller 120 also operates the rectifier 114 in a second or normal mode, in which the rectifier controller 124 provides the rectifier switching control signals 125 using pulse width modulation according to any suitable control schemes (e.g., space vector modulation or SVM, selective harmonic elimination or SHE, etc.) in order to cause the rectifier 114 to convert AC input power from the output of the filter circuit 120 to provide DC output power to the intermediate DC bus circuit (CDC) and a connected load (e.g., one or more inverters 116 in FIG. 1).

As further shown in FIG. 2, the controller 120 in one example includes a processor 200 operatively coupled with an associated electronic memory 202. The controller 120 and the components thereof may be any suitable hardware, processor-executed software, processor-executed firmware, logic, or combinations thereof that are adapted, programmed, or otherwise configured to implement the functions illustrated and described herein. The controller 120 in certain embodiments may be implemented, in whole or in part, as software components executed using one or more processing elements, such as one or more processors 200, and may be implemented as a set of sub-components or objects including computer executable instructions stored in the non-transitory computer readable electronic memory 202 for operation using computer readable data executing on one or more hardware platforms such as one or more computers including one or more processors, data stores, memory, etc. The components of the controller 120 may be executed on the same computer processor or in distributed fashion in two or more processing components that are operatively coupled with one another to provide the functionality and operation described herein.

The controller 120 in one example is configured by execution in the processor 200 of instructions in the memory 202 to implement various motor drive functions as are known, as well as resonance detection and impedance computation functionality via the component 122 provided as a component including processor-executable instructions in the memory 202 in one example. Similarly, the rectifier control functions can be implemented at least in part via processor executable instructions 124 stored in the memory 202 for execution by the processor 200. In addition, the controller 120 can include various signal conditioning circuits for receiving and converting analog signals into digital signals, and for providing suitable output signals (e.g., rectifier switching control signals 125 and inverter switching control signals 127 (FIG. 1) suitable for operating the various switching devices of the rectifier 114 and the inverter 116.

The rectifier controller component 124 in one example implements multiple control loops in normal operation to cause the switching rectifier 114 to convert AC input power to provide DC output power. In the example of FIG. 2, the rectifier controller 124 includes a voltage control loop proportional-integral control component (PI controller) 210 operating on one or more voltage feedback signals (e.g., measured or computed DC bus voltage feedback value) and voltage setpoint values (e.g., setpoint or desired DC bus voltage value) that apply a proportional gain value 212 (KP-V) and an integral gain value 214 (KI-V) to a voltage error signal to compute one or more voltage control output signals or values for use in generating the rectifier switching control signals 125. In addition, the rectifier controller 124 implements a current control loop PI controller 220 with a proportional gain value 222 (KP-I) and an integral gain value 224 (KI-I). The current PI controller 220 operates on one or more current setpoint values and feedback values in order to compute a current control output signal or value also used in generating the rectifier switching control signals 125. The controller 120 also implements the resonance detection and impedance computation component 122 which operates in conjunction with the rectifier controller 124 to perform various functions detailed herein in operation of the controller 120 in a first (e.g., standby or startup) mode and in a second (e.g., normal) mode.

Referring also to FIG. 3, a method 300 illustrates an example process or method for operating the motor drive power conversion system 110 to mitigate resonance conditions in the filter circuit 112. In one example, the method 300 is implemented by the controller 120 of FIGS. 1 and 2. The drive is powered up at 302, and operation begins in the first or standby mode with the rectifier 114 and the inverter 116 off (e.g., all switches open). At 304, the controller 120 operates suitable precharging circuitry (not shown) to precharged the DC bus capacitor or capacitor CDC to a suitable level while the rectifier 114 and inverter 116 remain off. While still in the first mode with the inverter switches off, the controller 120 implements the resonance detection and impedance computation component 122 together with the rectifier controller 124 in order to turn on a single selected rectifier switch (e.g., Q1) while keeping the other rectifier switching devices (e.g., Q2-Q6) off at 306. For example, closing the upper switch Q1 when Vgc is greater than Vga causes current to flow from the node W through the upper diode of Q5 and back through the switch Q1. At 308, the component 122 causes the rectifier controller 124 to turn off the selected rectifier switching device Q1, while still maintaining the other rectifier switching devices Q2-Q6 off. In one example, the controller 120 provides a pulse signal 125 to the selected rectifier switching device Q1 at 306 and 308 in order to selectively short a pair of feeder lines of the source 102 for a predetermined time.

At 310, following the predetermined time period, the controller 120 assesses one or more feedback signals 119 to measure one or more filter voltages or currents associated with the selected rectifier switch Q1. In this example, turning on Q1 allows current to flow through the flyback diodes of one or both of rectifier input lines A the and/or W to the upper DC bus line DC+, and back through the switching device Q1. Since a current flow path is provided through the filter circuit 120 and the AC input source 102, the transient pulse created at 306 and 308 will cause the resonant circuit to undergo a transient response. In particular, the circuit will exhibit resonant behavior at a resonant frequency corresponding to the impedances of the line (e.g., source 102 including the grid and any feeder lines) and the components of the filter circuit 112.

FIG. 6 illustrates an equivalent circuit 600 for this circuit configuration following a pull supplied by turning on Q1 in the rectifier 114 of FIG. 2. As seen in FIG. 6, the DC bus capacitor CDC is connected to the first inductors L1c and L1a, and the corresponding filter capacitors Cfc and Cfa of the filter circuit 112, as well as grid inductances LGc and The respective grid inductances L1c and L1a in this case are the sum of the second (grid side) inductors L2c, L2a and the corresponding line inductances $L_{LINEc}$ and $L_{LINEa}$ (of the line impedances $Z_{LINE}$ shown in FIG. 1). For example, LGc in this example=L2c+$L_{LINEc}$, and LGa=L2a+$L_{LINEa}$.

Referring also to FIGS. 4 and 5, the controller 120 determines a resonant frequency $\omega_{res}$ based on the transient response of the measured voltage or current signal at 312 in FIG. 3. FIG. 4 illustrates a graph 400 showing curves 402, 404 and 406, respectively corresponding to the Vca, Vcb and Vcc capacitor voltage feedback signals 119. A graph 500 and FIG. 5 illustrates filter output current waveforms 502, 504 and 506 corresponding to the first inductor currents I1a, I1b and I1c. As seen in the graphs 400 and 500, the controller 120 turns on the single selected rectifier switching device (e.g., Q1) at time T1 (at 306 in FIG. 3), and then turns off the selected switch at time T2 (at 308). As can be seen in the voltage and current graphs 400 and 500, the controller 120 turns on the selected switch for a non-zero time T1-T2. After the selected switch is again turned off at T2, the controller 120 measures the filter voltage and/or current associated with the selected rectifier switch at 310. At 312, the controller 120 determines the resonant frequency $\omega_{res}$ based on the transient response of the measured voltage or current signal using any suitable techniques. In one example, the resonance detection and impedance computation component 122 includes program instructions to implement Fast Fourier Transform (FFT), zero crossing, filtering and/or peak detection computations based on digital values corresponding to the measured waveform or waveforms 402, 404, 406, 502, 504 and/or 506 to determine the resonant frequency $\omega_{res}$. As seen in FIGS. 4 and 5, for example, the resonant frequency $\omega_{res}$ is the reciprocal of a discernible period in the oscillations of the associated voltage and/or current signals corresponding to the selected actuated switch Q1.

Based on the equivalent circuit (e.g., FIG. 6) of the system corresponding to the Q1 pulse, the controller 120 computes a line impedance (e.g., line inductance) based on the resonant frequency $\omega_{res}$ at 314. The controller 120 may repeat the process for one or more of the remaining feeder line pairs by selectively pulsing another selected one of the rectifier switching devices Q2-Q5. In the example of FIG. 3, a determination is made at 316 by the controller 120 as to whether all pairs have been tested. If not (NO at 316), the next switch is selected at 318 and the process 300 returns to 306-314 as previously described. If more than one iteration is implemented, the detection and computation component 122 may use any suitable technique for algorithm to determine a single resonant frequency value $\omega_{res}$ and corresponding line impedance value or values at 312 and 314 based on multiple iterations.

The resonant frequency value $\omega_{res}$ in one example is given by the following equation (1):

$$\omega_{res} = \sqrt{\frac{L'_g + L_1}{L'_g L_1 C_f}}, \quad (1)$$

where Lg is the initially unknown grid inductance value including the grid side filter inductor L2 (e.g., Lg=$L_2$+$L_{LINE}$). In this approach, the capacitance value of the DC bus capacitor CDC is ignored, as the capacitance of the DC bus is typically very large and will not affect the oscillatory operation of the filter and grid during resonance at the resonant frequency $\omega_{res}$. The controller 120 in one example computes the line impedance value $L_{LINE}$ at 314 according to the following equation (2):

$$L_{line} = \frac{L_1 + L_2 - \omega_{res}^2 L_1 L_2 C_f}{\omega_{res}^2 L_1 C_f - 1}. \qquad (2)$$

Since the inductance and capacitance values of the filter circuit components are known, the impedance computation component 122 includes values for these components stored in the memory 202, and the computation of equation (2) can be performed for each iteration at 306-314 in FIG. 3.

At 320, the controller 120 selectively adjusts one or more rectifier control parameters to mitigate filter resonance based on the resonant frequency $\omega_{res}$. In one example, the resonance detection and impedance computation component 122 selectively updates one or more of the voltage and/or current loop PI controller gain values 212, 214, 222 and/or 224 used by the rectifier controller 124 for normal operation of the motor drive system 110 at 320 in FIG. 3. In this regard, the controller 120 can be programmed or otherwise configured to perform the above described line impedance determination on power up and/or during any standby mode operation. In certain embodiments, moreover, the controller 120 is responsive to user initiated resonance detection/impedance computation commands or signals (e.g., from a user interface or external network-connected control system component (not shown) to enter the standby mode and to perform the processing at 304-314 in order to determine the resonant frequency frequency $\omega_{res}$ and optionally to compute the line impedance value $L_{LINE}$.

Returning to FIG. 3, the drive 110 enters normal mode operation with the controller 120 implementing normal rectifier switching operation at 322. In this second operating mode, the controller 120 employs the rectifier controller 124 to implement normal AC/DC conversion operation by selectively providing the switching control signals 125 to cause the rectifier 114 to convert AC input power to provide DC output power at the DC output terminals. During this normal switching operation, the resonance detection and impedance computation component 122 is implemented by the controller 120 in order to measure one or more filter voltage or current signals or values 119 at 324 while the rectifier 114 is converting AC input power to provide the DC output power. At 326, the component 122 determines the resonant frequency $\omega_{res}$ based on the measured voltage or current signal. This is unlike intrusive on-line approaches for resonance detection and/or impedance measurements, since the controller 120 does not disturb the normal rectifier switching control signals 125 to create false transients in the system. Instead, the controller 120 performs passive monitoring at 324 and 326, and uses measured values to identify potential resonant conditions in the filter circuit 112. In this regard, certain feedback values 119 may provide higher signal/noise ratios for this resonance detection function at 324, 326 than others. For instance, line currents will typically have relatively high amplitude fundamental signal content, whereas the filter capacitor voltages and/or filter capacitor circuit currents may be preferred for the measurement and assessment at 324 and 326 during online operation of the AFE, rectifier 114.

At 328, the controller 120 can selectively adjust rectifier control parameters (e.g., the PI proportional and/or integral gain values 212, 214, 222 and/or 224 above) to combat resonance based on the resonant frequency $\omega_{res}$ determined at 326. In this manner, the controller 120 provides active damping on demand in a real-time, on-line condition of the drive 110. As a result, switching in or out of new loads on the grid 102 and/or any other grid side impedance dynamics can be accommodated by adaptive control of the rectifier 114 in order to mitigate or avoid resonance. For instance, the adjustment at 328 (and the adjustment at 320 above) can include selectively reducing one or more of the PI controller gains 212, 214, 222 and/or 224 to mitigate filter resonance based on the resonant frequency $\omega_{res}$ while the rectifier 114 is converting AC input power to provide the DC output power. In one example, the controller 120 also measures the amplitude of any such resonant signal during the monitoring at 324, 326, and the adaptive rectifier control adjustment can be proportional (e.g., more PI controller gain reduction based on higher amplitude detected resonance). In this manner, the bandwidth or bandwidths of one or more control loops implemented by the rectifier controller 124 (e.g., voltage and/or current control loops 210, 220) can be selectively reduced in order to avoid control loop operation at frequencies near a detected resonant frequency $\omega_{res}$ determined at 326.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:
1. A power conversion system, comprising:
   an AC input coupleable to receive AC input power from a power source;
   a rectifier, including a plurality of AC input terminals, first and second DC output terminals, and a plurality of switching devices individually coupled between a corresponding one of the AC input terminals and one of the first and second DC output terminals;
   a filter circuit coupled between the AC input and the rectifier; and
   a controller to provide switching control signals to operate the switching devices of the rectifier, the controller operative in a first mode to:
      turn a single one of the switching devices on for a non-zero time period,
      turn the single one of the switching devices off after the non-zero time period,
      measure a voltage or current signal associated with the filter circuit while all of the switching devices are off after the non-zero time period,
      determine a resonant frequency based on a transient response of the measured voltage or current signal, and
      selectively adjust a rectifier control parameter to mitigate filter resonance based on the resonant frequency.

2. The power conversion system of claim 1, wherein the controller is further operative to compute a line impedance associated with the power source based on the resonant frequency.

3. The power conversion system of claim 1, wherein the controller is operative in a second mode to:
   selectively provide the switching control signals to cause the rectifier to convert AC input power to provide DC output power at the DC output terminals;
   measure the voltage or current signal associated with the filter circuit while the rectifier is converting AC input power to provide the DC output power;
   determine the resonant frequency based on the measured voltage or current signal; and
   selectively adjust the rectifier control parameter to mitigate filter resonance based on the resonant frequency while the rectifier is converting AC input power to provide the DC output power.

4. The power conversion system of claim 3, wherein the controller is operative in the first and second modes to selectively adjust the rectifier control parameter to reduce a control loop bandwidth based on the resonant frequency.

5. The power conversion system of claim 1, wherein the controller is operative in the first mode to selectively adjust the rectifier control parameter to reduce a control loop bandwidth based on the resonant frequency.

6. The power conversion system of claim 1, wherein the controller is operative after the power conversion system is initially powered up to precharge a DC bus capacitor at the output of the rectifier before turning the single one of the switching devices on for the non-zero time period.

7. The power conversion system of claim 1, wherein the controller is operative to:
   individually turn each of the switching devices on and off and measure the voltage or current signal to determine a corresponding resonant frequency in the first mode;
   determine a plurality of resonant frequencies based on a transient response of the measured voltage or current signal individually corresponding to the plurality of switching devices; and
   selectively adjust a rectifier control parameter to mitigate filter resonance based on at least one of the plurality of resonant frequencies.

8. The power conversion system of claim 7, wherein the controller is further operative to compute a line impedance associated with the power source based on at least one of the plurality of resonant frequencies.

9. The power conversion system of claim 7, wherein the controller is operative in a second mode to:
   selectively provide the switching control signals to cause the rectifier to convert AC input power to provide DC output power at the DC output terminals;
   measure the voltage or current signal associated with the filter circuit while the rectifier is converting AC input power to provide the DC output power;
   determine the resonant frequency based on the measured voltage or current signal; and
   selectively adjust the rectifier control parameter to mitigate filter resonance based on the resonant frequency while the rectifier is converting AC input power to provide the DC output power.

10. The power conversion system of claim 9, wherein the controller is operative in the first and second modes to selectively adjust the rectifier control parameter to reduce a control loop bandwidth based on the resonant frequency.

11. A method to mitigate resonance in a filter of a power conversion system, the method comprising, in a first operating mode:
    turning a single one of a plurality of rectifier switching devices on for a non-zero time period;
    turning the single one of the rectifier switching devices off after the non-zero time period;
    measuring a voltage or current signal associated with the filter circuit while all of the plurality of switching devices are off after the non-zero time period,
    determining a resonant frequency based on a transient response of the measured voltage or current signal; and
    selectively adjusting a rectifier control parameter to mitigate filter resonance based on the resonant frequency.

12. The method of claim 11, further comprising, in the first operating mode, computing a line impedance associated with the power source based on the resonant frequency.

13. The method of claim 11, further comprising, in a second mode:
    selectively providing switching control signals to cause a rectifier to convert AC input power to provide DC output power;
    measuring the voltage or current signal associated with the filter circuit while the rectifier is converting AC input power to DC output power;
    determining the resonant frequency based on the measured voltage or current signal; and
    selectively adjusting the rectifier control parameter to mitigate filter resonance based on the resonant frequency while the rectifier is converting AC input power to DC output power.

14. The method of claim 13, further comprising, in the first and second modes, selectively adjusting the rectifier control parameter to reduce a control loop bandwidth based on the resonant frequency.

15. The method of claim 11, further comprising, in the first mode, selectively adjusting the rectifier control parameter to reduce a control loop bandwidth based on the resonant frequency.

16. The method of claim 11, further comprising, after the power conversion system is initially powered up, precharging a DC bus capacitor at the output of the rectifier before turning the single one of the switching devices on for the non-zero time period.

17. The method of claim 11, further comprising:
    individually turning each of the switching devices on and off and measure the voltage or current signal to determine a corresponding resonant frequency in the first mode;
    determining a plurality of resonant frequencies based on a transient response of the measured voltage or current signal individually corresponding to the plurality of switching devices; and
    selectively adjusting a rectifier control parameter to mitigate filter resonance based on at least one of the plurality of resonant frequencies.

18. A non-transitory computer readable medium with computer executable instructions for mitigating resonance in a filter of a power conversion system, the computer readable medium comprising computer executable instructions for, in a first operating mode:
    turning a single one of a plurality of rectifier switching devices on for a non-zero time period;
    turning the single one of the rectifier switching devices off after the non-zero time period;

measuring a voltage or current signal associated with the filter circuit while all of the plurality of switching devices are off after the non-zero time period, determining a resonant frequency based on a transient response of the measured voltage or current signal; and selectively adjusting a rectifier control parameter to mitigate filter resonance based on the resonant frequency.

19. The non-transitory computer readable medium of claim 18, further comprising, computer executable instructions for, in a second mode:

selectively providing switching control signals to cause a rectifier to convert AC input power to provide DC output power;

measuring the voltage or current signal associated with the filter circuit while the rectifier is converting AC input power to DC output power;

determining the resonant frequency based on the measured voltage or current signal; and selectively adjusting the rectifier control parameter to mitigate filter resonance based on the resonant frequency while the rectifier is converting AC input power to DC output power.

20. The non-transitory computer readable medium of claim 18, further comprising, computer executable instructions for, in the first mode, selectively adjusting the rectifier control parameter to reduce a control loop bandwidth based on the resonant frequency.

* * * * *